United States Patent
Ishida (10) Patent No.: US 6,556,572 B1
(45) Date of Patent: Apr. 29, 2003

(54) SCHEDULER FOR ADJUSTING CELL FORWARDING DEPENDENT UPON TRAFFIC AND DELAY

(75) Inventor: Hiroshi Ishida, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/272,301

(22) Filed: Mar. 19, 1999

(30) Foreign Application Priority Data

Mar. 26, 1998 (JP) .......................................... 10-079260

(51) Int. Cl.$^7$ .............................................. H04L 12/56
(52) U.S. Cl. ............................. 370/395.41; 370/395.43
(58) Field of Search ......................... 370/395.4, 395.41, 370/395.42, 395.43, 412, 417

(56) References Cited

U.S. PATENT DOCUMENTS 6,229,812 B1 * 5/2001 Parruck et al. .......... 370/395.3

OTHER PUBLICATIONS

Shimonishi et al. "List–Based Weighted Round Robin Scheduling" 1997 Society Conference of the Institute of Electronics, Information and Communication Engineers of Japan, B–6–44.

* cited by examiner

Primary Examiner—Melvin Marcelo
(74) Attorney, Agent, or Firm—Venable; Michael A. Sartori (57) ABSTRACT

In an asynchronous transfer mode (ATM) network, ATM cells received are classified to the queues appropriate to the service classes required by the ATM cells. The status registers manage the controlled delay of the ATM cells for the service classes and the queue length of the ATM cells which queue up in the queues. On the basis of the controlled delay and the queue length, the scheduler adaptively determines a weight, on the basis of which the ATM cells queuing up in the queues are to be forwarded to thereby effectively control the delay of ATM cells to be forwarded.

11 Claims, 11 Drawing Sheets

United States Patent US 6,556,572 B1

SCHEDULER FOR ADJUSTING CELL FORWARDING DEPENDENT UPON TRAFFIC AND DELAY

BACKGROUND OF THE INVENTION

1. Field of the Invention

The present invention relates to apparatus for and a method of scheduling cell forwarding for use specifically in an asynchronous transfer mode (ATM) network, for example.

2. Description of the Background Art

To the scheduling of forwarding cells in the ATM transferring systems, the round robin scheduling is known to be applicable. For example, H. Shimonishi, et al. "List-Based Weighted Round Robin Scheduling" 1997 Society Conference of The Institute of Electronics, Information and Communication Engineers of Japan, B-6-44, 1997, discloses an application of the weighted round robin (WRR) scheduling to transmitting cells in the ATM transfer systems. The weighted round robin scheduling is commonly applied to ATM switches as a scheduling system which ensures the minimum bandwidths to be established appropriately for respective queues of waiting cells to be forwarded.

With the commonly used weighted round robin scheduling, however, no account has been taken of delay encountered in transmitting cells. The cell delay is one of the most important factors influencing the quality of transmission along with the bandwidth. In order to control the delay of cells, the delay factor has to be taken account of in scheduling the forwarding of cells.

SUMMARY OF THE INVENTION

It is therefore an object of the present invention to provide an apparatus for and a method of scheduling cell forwarding with the delay of cells to be forwarded effectively controlled.

According to the present invention, the delay of cells to be forwarded is effectively controlled in scheduling cell forwarding by means of the round robin scheduling with a weight adaptively adjusted in response to the traffic and the controlled delay of cells to be forwarded.

In accordance with the present invention, an apparatus for scheduling cell forwarding for use in an ATM network for switching ATM cells, comprises: a plurality of queues each provided for one of classes of transmission quality for queuing up an ATM cell in corresponding one of the classes which is required by the ATM cell; a cell classifying circuit for receiving an ATM cell and classifying the ATM cell received to one of said plurality of queues in accordance with the class required by the ATM cell; a status circuit for detecting a status of said plurality of queues and storing status data representative of the status detected; and a scheduling circuit operative in response to said status circuit for determining when the ATM cell queuing up in said plurality of queues is to be forwarded.

Further in accordance with the invention, a method of scheduling cell forwarding for use in an ATM network for switching an ATM cell, comprising the steps of: preparing a plurality of queues each for one of classes of transmission quality for queuing up an ATM cell in corresponding one of the classes which is required by the ATM cell; receiving an ATM cell; classifying the ATM cell received to one of the plurality of queues in accordance with the class required by the ATM cell; detecting a status of the plurality of queues and storing status data representative of the status detected; and determining, in response to the status data, when the ATM cell queuing up in the plurality of queues is to be forwarded.

More specifically, in an ATM network, ATM cells received are classified to the queue appropriate to the service classes required by the ATM cells. The status registers manage the controlled delay of the ATM cells for the service classes and the queue length of the ATM cells which queue up in the queues. On the basis of the controlled delay and the queue length, the scheduler adaptively determines a weight, on the basis of which the ATM cells queuing up in the queues are to be forwarded to thereby effectively control the delay of ATM cells to be forwarded.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 2:
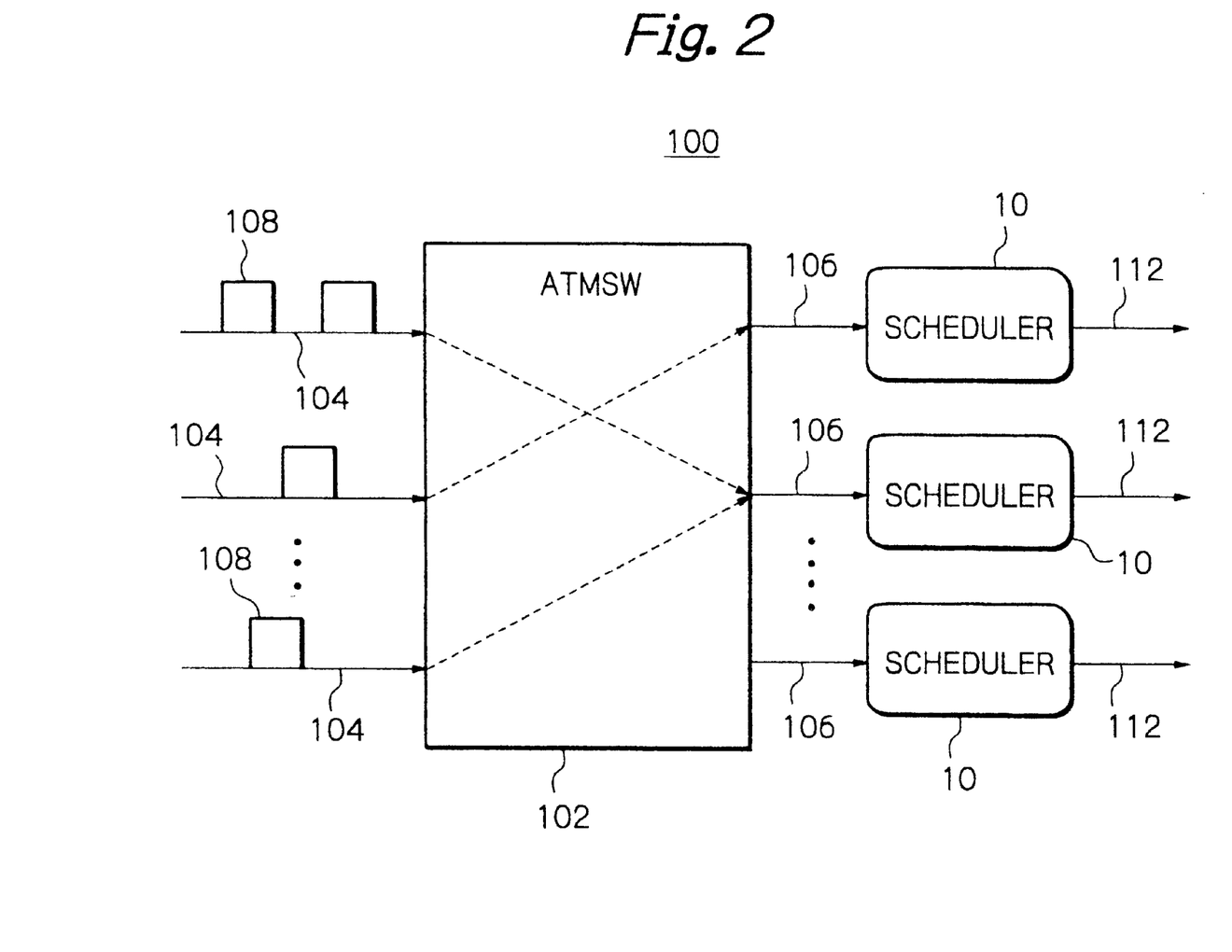
FIG. 2 schematically shows a preferred embodiment of an ATM switching system which includes the scheduler shown in FIG. 1.

Referring first to FIG. 2, a preferred embodiment of an asynchronous transfer mode (ATM) switching system 100 includes an ATM switch (ATMSW) 102 having incoming transmission lines 104 and outgoing transmission lines 106 appearing on both its sides. The ATM switch 102 serves to switch and multiplex cells incoming on the incoming lines 104 to appropriate outgoing transmission lines 106 in response to a service class of the incoming cells 108. In the figure, only three incoming lines 104 and three outgoing lines 106 are shown just for simplicity although a lot of incoming and outgoing lines are in practice interconnected to the ATM switch 102.

Figure 9:
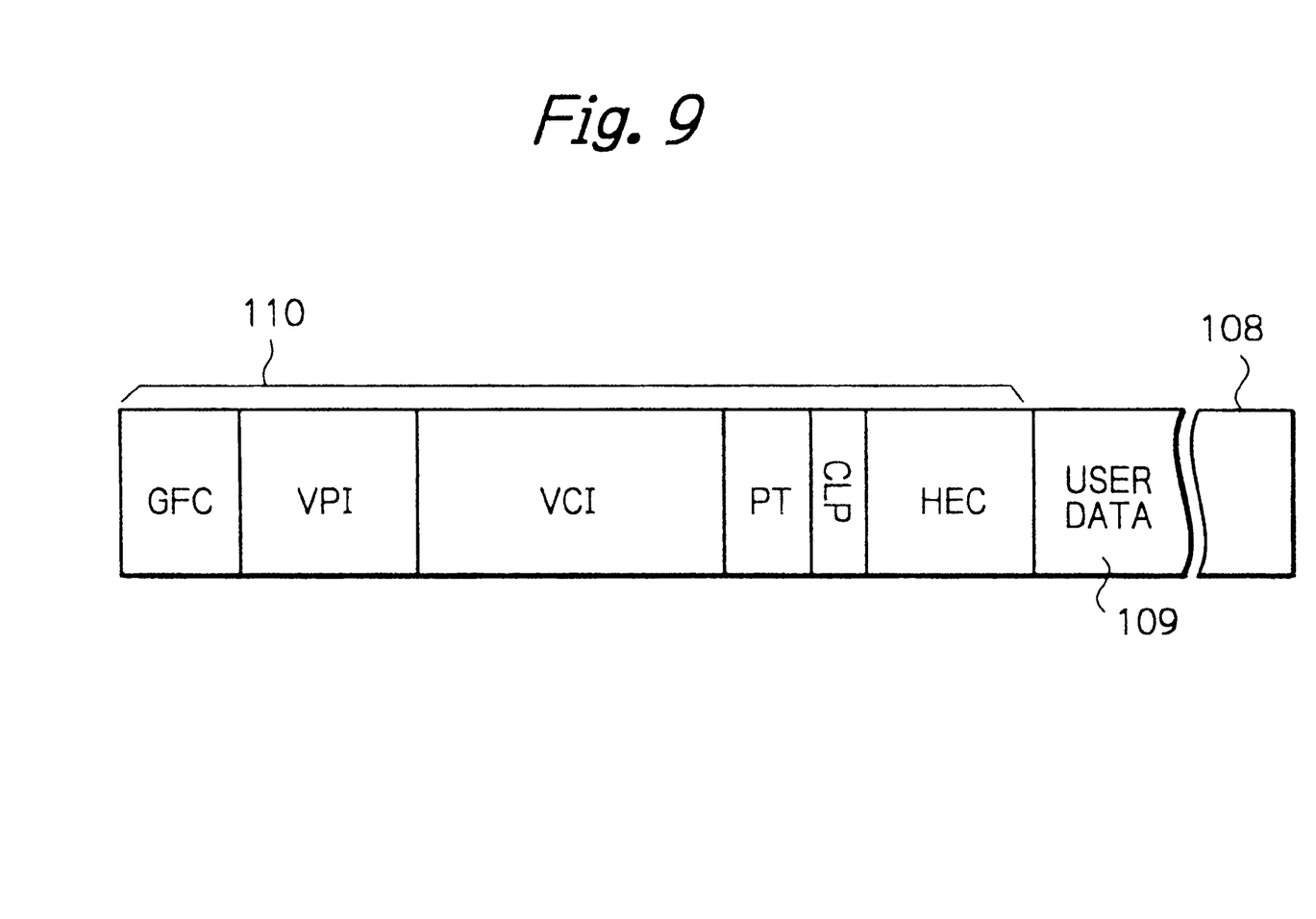
FIG. 9 schematically shows the format of an ATM cell used in the embodiment shown in FIG. 2.

The cells transferred through the ATM switching system 100 are specifically defined as ATM cells. The ATM cell 108, which is fixed in length, consists of 53 bytes including 5-byte header 110, FIG. 9. As shown in FIG. 9, the header 110 includes the fields of a Generic Flow Control (GFC), a Virtual Path Identification (VPI), a Virtual Channel Identification (VCI), a Payload Type (PT), a Cell Loss Priority (CLP) and a Header Error Control (HEC). The present invention pertains more specifically to the VPI and the VCI. The VCI, for example, may define by 16 bits the service class of the ATM cell 108, such as audio, video and data signals, according to the nature of the USER DATA 109 following the header 110.

Returning to FIG. 2, to the outgoing lines 106, associatedly interconnected are scheduler units 10, which are adapted to schedule the order of transmitting cells on outgoing lines 112 dependent upon the quality of transmission required for specific cells 108. The scheduling of the order, or priority, of transmitting cells is determined in connection with the VPI/VCI of specific cells 108. The scheduler units 10 transfer the cells 108 switched and multiplexed by the ATM switch 102 to outgoing lines 112 in response to the order, or priority, thus determined.

Figure 1:
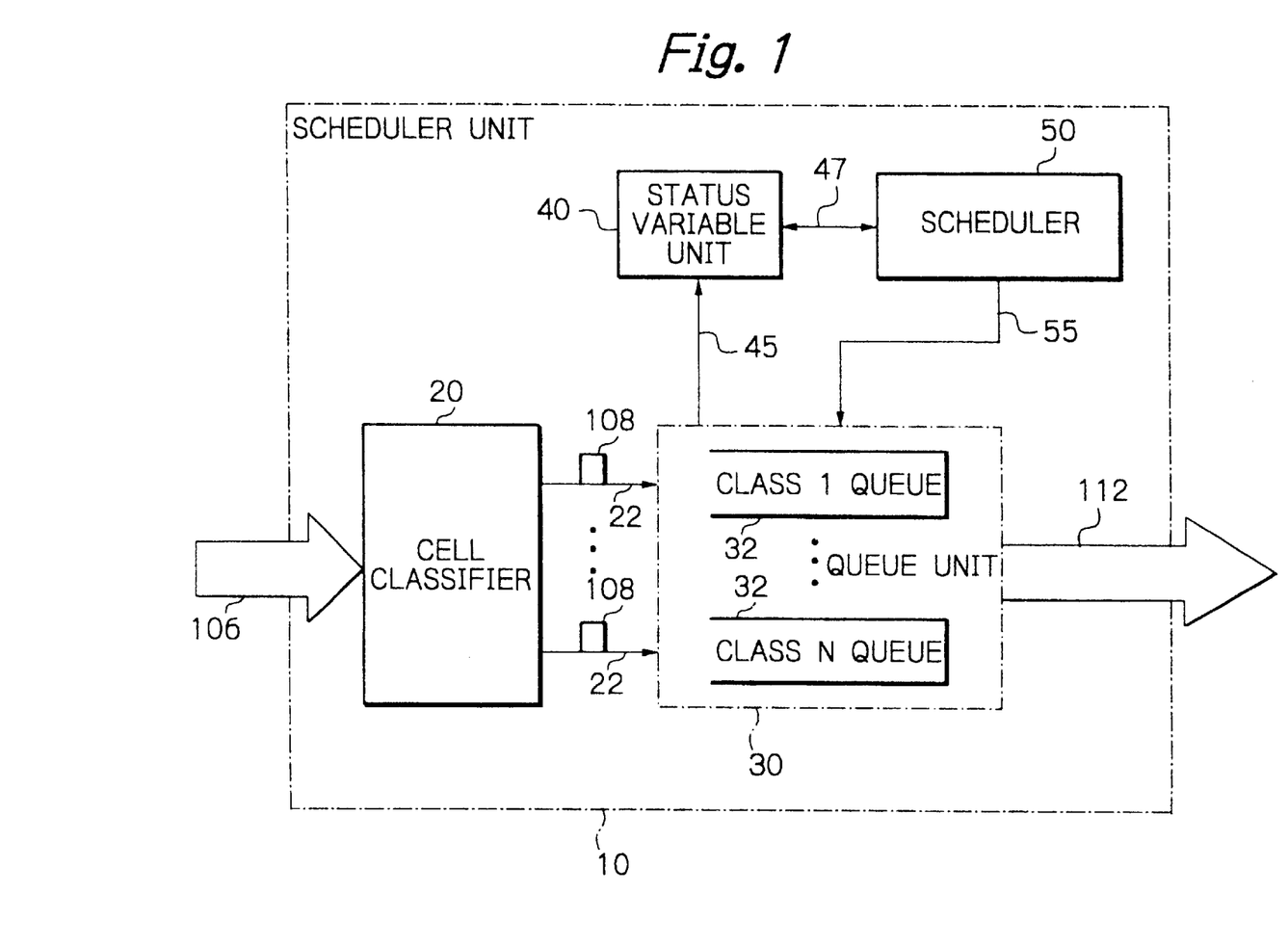
FIG. 1 is a schematic block diagram showing a preferred embodiment of the scheduler of forwarding cells in accordance with the present invention.

Now with reference to FIG. 1, the scheduler unit 10 comprises a cell classifier 20 which has its input interconnected to the outgoing transmission line 106 from the ATM switch 102. In the figures, the like components are designated with the same reference numerals. The cell classifier 20 is adapted to receive cells 108 outputted from the ATM switch 102 on the outgoing line 106 and read the VCI of the cells 108 to identify the service class of the cells 108.

More specifically, when a remote transmitter terminal, not shown, starts transmitting ATM cells 108 over the incoming transmission line 104 to the ATM switch 102, the transmitter negotiates with the ATM switch 102 to notify the switch 102 of a frequency band to be used and an allowable delay of ATM cells 108 to be switched, prior to transferring ATM cells 108. The ATM switch 102 sets up in the cell classifier 20 a correspondence table, not shown, which defines a service class associated with the VPI/VCI of ATM cells 108 which will be received from the remote transmitter terminal. Upon receiving ATM cells 108 from that terminal, the cell classifier 20 references the table in terms of the VPI/VCI of the ATM cells 108 thus received to determine which service class the cells 108 are directed to.

The cell classifier 20 has its outputs 22 interconnected to corresponding input ports of a queue unit 30. In the illustrative embodiment, the scheduler unit 10 is adapted to deal with N service classes, where N is a natural number, and there are accordingly provided N output ports 22 in accordance with the N service classes.

Correspondingly, the queue unit 30 includes N queues 32, which are named as class 1 queue through class N queue in FIG. 1. The cells 22 classified by the class classifier 20 and developed on the associated output ports 22 are in turn received by one of the queues 32 associated with the output ports 22. More specifically, the cells 22 are temporarily stored in one of the queues 32 which is associated with the service class, or VPI/VCI, of the cells 108. A cell or a stream of cells originating from one user is classified into one of the queues 32 together with another cell or stream of cells originating from a different user when both require the same class of transmission quality. By contrast, if both cells or streams of cells require the different classes of transmission, then both cells or streams of cells are accordingly stored in different corresponding queues 32.

The queue unit 32 has its output port interconnected to outgoing line 112. The cells 108 temporarily stored, or queuing up, in the queues 32 will be outputted to the outgoing line 112 in accordance with the round robin scheduling, as will be described later in detail. The round robin scheduling is controlled by a scheduler 50 interconnected to the queue unit 30 by a control connection 55.

Also interconnected to the queue unit 30 by a connection 45 is a status variable unit 40, which is adapted to hold and update data representing the current status of queues 32. The status variable unit 40 is also interconnected to the scheduler 50 by a connection 47.

Figure 3:
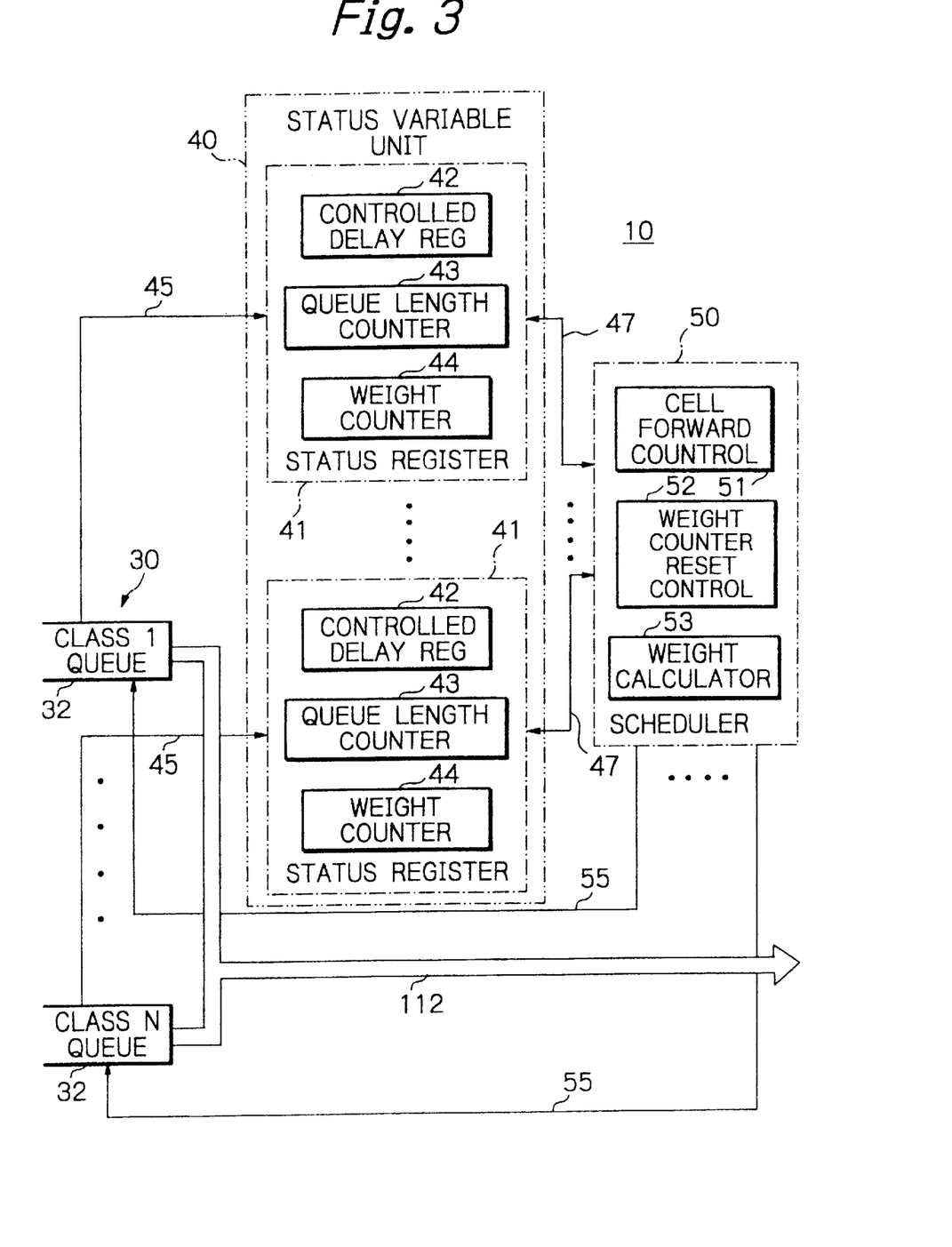
FIG. 3 is a schematic block diagram more specifically showing part of the scheduler shown in FIG. 1.

With reference to FIG. 3, a specific structure of the status variable unit 40 and the scheduler 50 will be described in more detail. As shown, the status variable unit 40 is comprised of N status registers 41, which are correspondingly provided to the service classes 1–N, and interconnected to the associated queues 32 by lines 45. The status registers 41 include a controlled delay register 42, a queue length counter 43 and a weight counter 44. The status registers 41 are interconnected to the scheduler 50 by associated lines 47.

The controlled delay register 42 is adapted to store data representing a delay to be controlled depending upon the service class inherent to that delay register 42. The data representing such a delay is set in the delay register 42 inherently to the system, according to the outgoing line 112, for example. Alternatively, such delay data may dynamically or adaptively be set in the delay register 42.

The queue length counter 43 is adapted to count the ATM cells 108 waiting for transmission in the associated queue 32 and hold a count representing the number of cells 108, namely the length of the queue 32. The queue length counter 43 is a reversible counter which increments by "1" in response to an ATM cell 108 inputted into the associated queue 32, and decrements by "1" to an ATM cell 108 outputted from the queue 32.

The weight counter 44 functions also as a reversible counter adapted to hold a weight value which is associated with the number of cells 108 which can be forwarded currently, and decrement by "1" in response to a cell 108 forwarded from the associated queue 32 to the outgoing line 112. The weight counter 44 is also adapted to be updated at predetermined reset intervals to a value determined in a manner which will later be described in detail.

As shown in FIG. 3, the scheduler 50 is interconnected to the status registers 41, and includes a cell forward control 51, a weight counter reset control 52 and a weight calculator 53. The cell forward control 51 is adapted to periodically, but independently of incoming ATM cells, check the weight counters 44 in accordance with the round robin scheduling, for example, and determine whether or not the queue 32 in question includes a cell 108 to be forwarded. In the illustrative embodiment, the cell forward control 51 scans the weight counters 44 in the round robin scheduling fashion in the cell processing intervals.

More specifically, if the cell forward control 51 finds that a weight counter 44 in a specific service class in question contains a count equal to or larger than unity, then it picks up an oldest cell 108 held, or queuing up, in the queue 32 associated with the weight counter 44 in question to be forwarded to the outgoing line 112. Upon the cell 108 being picked up from the queue 32, the forward control 51 controls the weight counter 44 associated with the queue 32 to decrement. The scheduler 50 in turn controls the queue 32 in question accordingly through the control line 55. If the forward control 51 finds that a weight counter 44 in a specific service class in question contains a count equal to or less than zero, then it determines not to pick up a cell 108 which may be held in the queue 32 associated with the weight counter 44 in question, and shifts its scanning to another weight counter 44.

The weight counter reset control 52 is adapted to determine when the weight counters 44 are to be reset. More specifically, the weight counter reset control 52 periodically checks the queue length counters 43 and the weight counters 44. Since the queue length counters 43 and the weight counters 44 are provided for the service classes provided by the ATM switching system 100, the reset control 52 checks the counters 43 and 44 for each of the service classes. If the weight counter reset control 52 determines either when all of the counts contained in the queue length counters 43, or queue lengths, are equal to zero, or when all of the counts held in the weight counters 44, or weight values, are equal to zero, then it resets all the weight counters 44 to the respective reset values, which are calculated by the weight calculator 53, which will be described later.

The reset values for the weight counters 44 are obtained by the weight calculator 53. The weight calculator 53 is adapted to calculate the reset values for the respective service classes provided by the ATM switching system 100. The present invention provides several ways of calculating the reset values to which the weight counters 44 are reset for the service classes. The ways of reset value calculation will be described later on.

In operation, the ATM cells 108 incoming on the incoming lines 104 are switched pursuant to the routing information carried by the header 110 of the cells 108 by the ATM switch 102 onto the outgoing transmission lines 106. The cell classifier 20 of the scheduler unit 10 receives the cells 108 on its input transmission line 106, and classifies the cells 108 into the service classes in accordance with the class of service information associated with the VPI/VCI of the header 110 of the cells 108. The classified cells 108 will then be delivered from the appropriate output ports 22 to the queues 32 associated with the service classes thus identified by the classifier 20. In response, the queue length counter 43 associated with the queue 32 which has received the cell 108 from the output 22 from the cell classifier 20 increments accordingly.

The cell forward control 51 periodically watches different weight counters 44, i.e. at the time interval of cell processings independently of the timings of the incoming cells 108. If the forward control 51 finds the count held in the weight counter 43 equal to unity or more, then it controls the queue 32 associated therewith to output the oldest one of the cells 108 waiting in the queue 32. At the same time, the forward control 51 decrements the queue length counter 43 and the weight counter 44 associated with the queue 32 in question. The forward control 51 continues the operation throughout all of the queues 32 in the round robin fashion. The cells 108 will thus be outputted from the queues 32 to the outgoing line 112 with the output timings thereof controlled by the cell forward control 51 of the scheduler 50.

The weight counters 44 are reset to a reset value which is calculated by the weight claculator 53 whenever the weight counter reset control 52 determines either when all of the counts contained in the queue length counters 43 are equal to zero, or when all of the counts held in the weight counters 44 are equal to zero. Otherwise, the weight counters 44 are not reset. For that purpose, the weight counter reset control 52 watches the queue length counters 43 and the weight counters 44 periodically, preferably at the time when the cell forward control 51 completed the checking of one of the weight counters 44 to control the forwarding of a cell 108 from the queue 32 associated therewith, or when the forward control 51 completed the checking of all of the weight counters 44 to control the forwarding of cells 108 from the queues 32 associated therewith.

Figure 4:
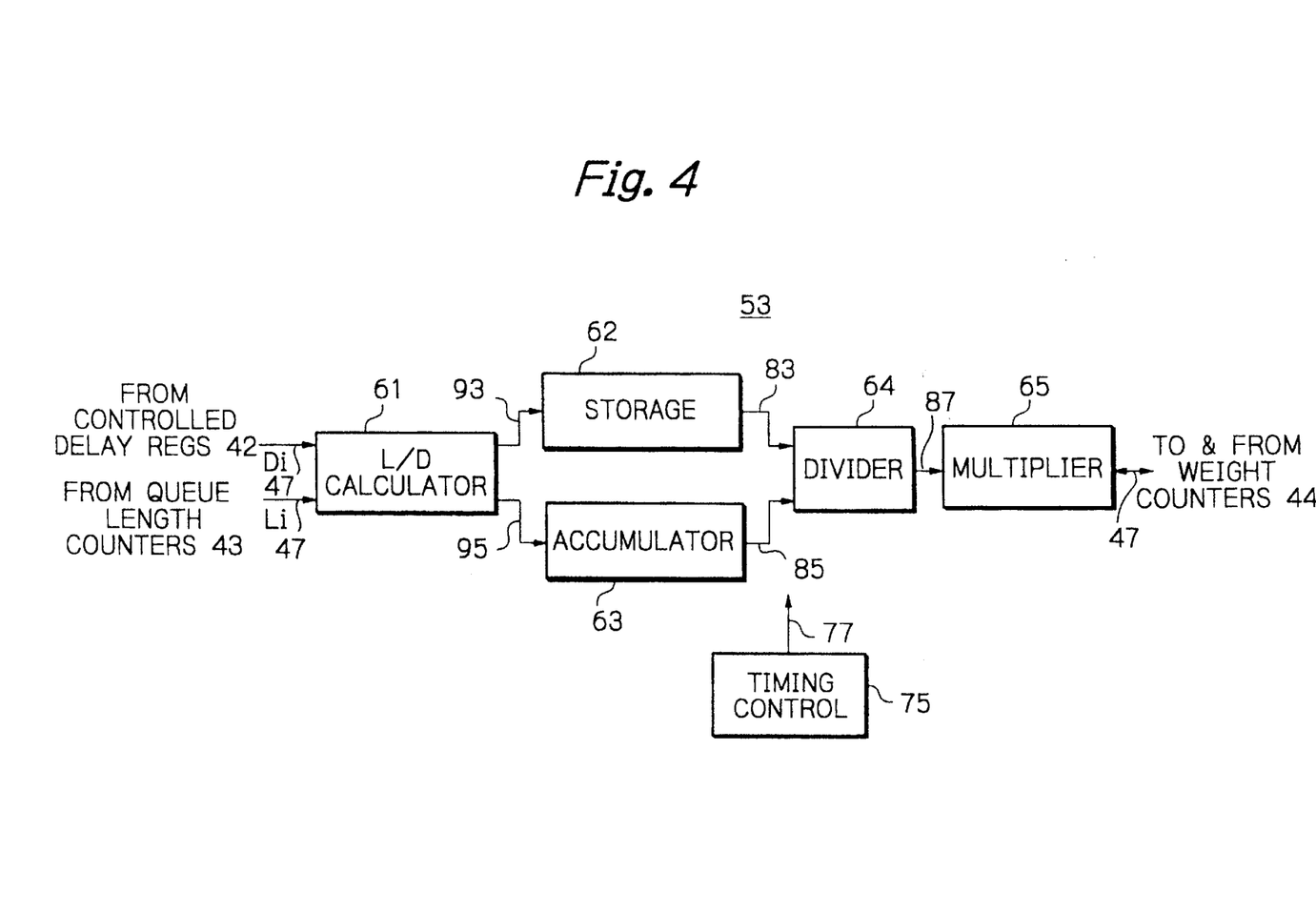
FIGS. 4–8 show in schematic block diagrams embodiments of the weight calculator shown in FIG. 3.

With the preferred embodiment, the reset values for the weight counters 44 may be calculated in several ways, as will be described below. Referring to FIG. 4, an embodiment of the weight calculator 53 is adapted to calculate a reset value Wi for the weight counter 44 of a service class i in accordance with the following expression (1), where i is a natural number from one to N, inclusive.

$$Wi = Wt*(Li/Di) \bigg/ \sum_{K=1}^{N}(Lk/Dk), \tag{1}$$

where Wt is the sum of the weights contained in the weight counters 44 for all of the service classes and preferably a constant, and Lk and Dk represent the length and the controlled delay of a queue 32 for a service class k, respectively. In addition, Li and Di represent the queue length and the delay ensured for a cell or a stream of cells 108 in a service class i, respectively.

The expression (1) is executed by an exemplified circuit structure of the weight calculator 53 shown in FIG. 4. The specific embodiment of the weight calculator 53 includes an L/D calculator 61 which has two input ports 47, one of which is interconnected to the controlled delay registers 42 and the other to the queue length counters 43 of all of the status registers 41. The L/D calculators 61 serves to fetch the value of the controlled delay Di from the controlled delay register 42 associated with the service class i as well as the value of the queue length Li from the queue length counter 43 associated with the same service class i, and divides the value of the controlled delay Di by the value of the queue length Li to obtain a resultant value Li/Di. The L/D calculator 61 has a couple of output ports 93 and 95 interconnected to the inputs of a storage or buffer 62 and an accumulator 63, respectively.

The storage 62 functions as temporarily holding the value Li/Di resultant from the L/D calculator 61 for the service class i in question to develop it on its output port 83 to one input of a divider 64. The accumulator 63 functions as cumulatively storing the resultant value Li/Di for all of the service classes 1 though N available to the ATM system 100. The accumulator 63 has its output port 85 interconnected to the other input of the divider 64.

The divider 64 is adapted for dividing the value Li/Di obtained from the storage 62 by the accumulated value 85 obtained from the accumulator 63. The divider 64 has its output port 87 interconnected to a multiplier 65, and outputs the result from the division on the output port 87 to the multiplier 65.

The multiplier 65 is interconnected to the weight counters 44 of all of the status registers 41 by the connections 47. The multiplier 65 is adapted to obtain the counts held in all the weight counters 44, sum up the counts thus obtained, and multiply the resultant sum with the divisional result from the output port 87 of the divider 64. The digits below the decimal point are rounded off. The value equal to zero or a positive integer will be transferred to one of the weight counters 47 which is directed to the service class i in question to thus be set in that weight counter 47 as its reset value.

The weight calculator 53 includes a timing control 75 which is adapted to control the L/D calculator 61, storage 62, accumulator 63, divider 64 and multiplier 65 so as to calculate the reset values W1–WN for all the service classes 1–N. For that aim, the timing control 75 is interconnected to the L/D calculator 61, storage 62, accumulator 63, divider 64 and multiplier 65 by the connection 77, which is shown conceptually with a single arrow in FIG. 4 just for the simplicity.

As discussed above, the illustrative embodiment of the weight calculator 53 obtains the reset value Wi for the weight counter 47 for a service class in question in accordance with the expression (1) to, set dynamically or adaptively that weight counter 47 with the reset value. As seen from the expression (1), the longer the queue length L1, i.e. the more the cells 108 waiting to be processed, the larger the reset value Wi set in the weight counter 47 associated with the service class i in question. For such a service class i, thus, the cells 108 waiting in the queue 32 have a greater possibility of, and the shorter delay encountered in, being forwarded on the outgoing line 112.

Also understood from the expression (1), the larger the controlled delay Di, i.e. the larger the allowable delay, for the service class i, the smaller reset value Wi to be set. Thus, the smaller the possibility of cells 108 being forwarded, and the larger the delay of the cells 108 for such a service class i. The realtime control on the delay in forwarding cells 108 is thus accomplished in dependent upon the traffic and the controlled delay of the cells.

Figure 5:
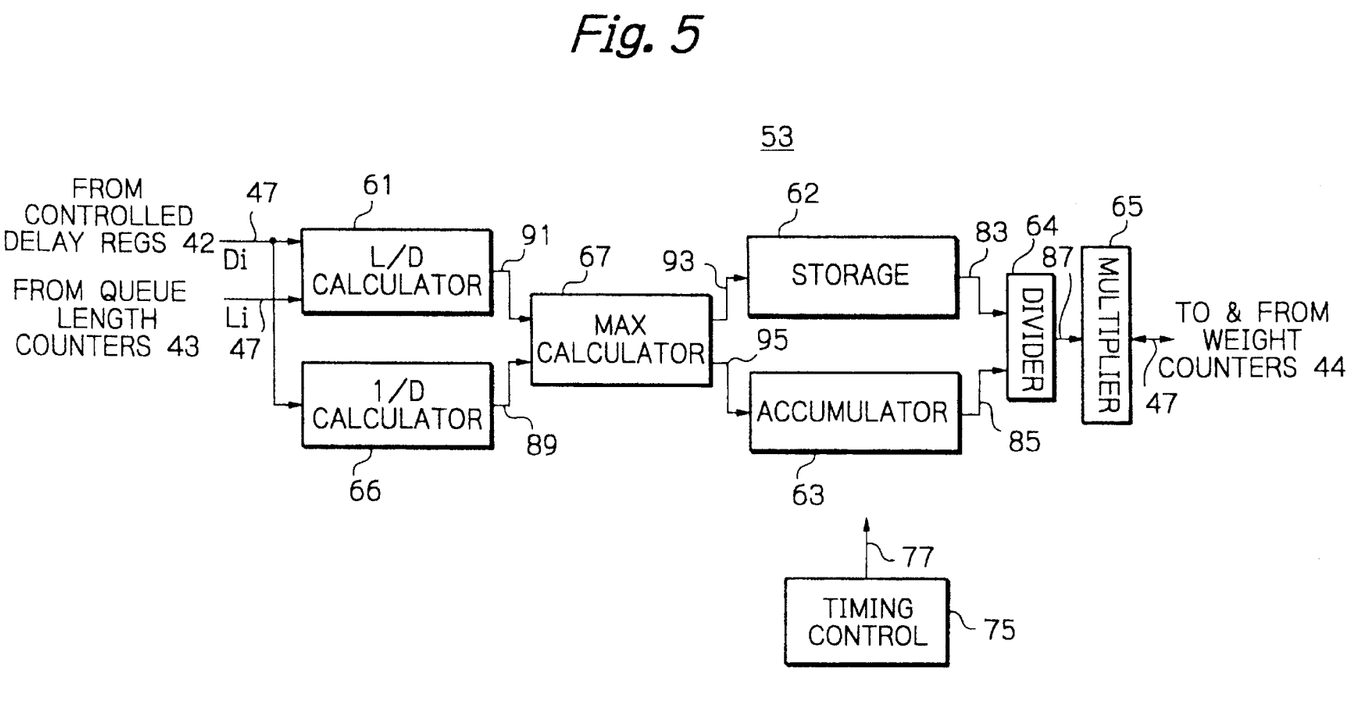

Referring now to FIG. 5, an alternative embodiment of the weight calculator 53 is adapted to calculate a reset value Wi for the weight counter 44 for the service class i in accordance with the following expression (2). In the figures, like components are designated with the same reference numerals.

$$Wi = Wt * \text{Max}(Li/Di, 1/Di) \bigg/ \sum_{K=1}^{N} \text{Max}(Lk/Dk, 1/Dk), \quad (2)$$

where Max(X, Y) denotes the larger of X and Y.

In order to accomplish the expression (2), the alternative embodiment of the weight calculator shown in FIG. 5 includes a 1/D calculator 66 and a maximum calculator 67 in addition to the components shown and described with reference to FIG. 4. The 1/D calculator 66 is a reciprocal circuit which is interconnected to the controlled delay registers 42 and receive the data representing the controlled delay Di for a specific service class i in question to obtain its reciprocal, 1/Di, which is in turn developed from its output 89 to one input of the maximum calculator 67. The maximum calculator 67 has its other input port 91 connected to the output from the L/D calculator 61. The maximum calculator 67 functions as a comparator adapted to compare both inputs 89 and 91 with each other to select the larger of both of them. The maximum calculator 67 has its outputs 93 and 95 interconnected to the inputs of the storage 62 and the accumulator 63, which receives the result from the comparison, that is, the larger of the Li/Di and 1/Di.

The timing control 75 is adapted to control the L/D calculator 61, 1/D calculator 66, maximum calculator 67, storage 62, accumulator 63, divider 64 and multiplier 65 so as to calculate the reset values W1–WN for all of the service classes 1–N according to the expression (2).

In operation, the L/D calculator 61 receives the values of the controlled delay Di and the queue length Li from the controlled delay register 42 and the queue length counter 43 associated with the service class i in question, respectively, to produce the resultant value Li/Di from its output 91 to the maximum calculator 67. The 1/D calculator 66 also receives the data of the controlled delay Di for the specific service class i in question to produce its reciprocal, 1/Di, from its output 89 to one input of the maximum calculator 67. The maximum calculator, or comparator, 67 in turn selects the larger one of both inputs 89 and 91 to deliver the selected one from its outputs 93 and 95 to the inputs of the storage 62 and the accumulator 63, respectively.

The storage or buffer 62 temporarily stores the output data from the comparator 67 to provide the one input 83 of the divider 64 with the output data, while the accumulator 63 sums up the same output data from the comparator 67 to produce the sum of the larger ones of the Li/Di and 1/Di with respect to all the service classes 1–N on its output 85 to the other input to the divider 64. The divider 64 in turn divides the larger one of Li/Di and 1/Di inputted from the storage 62 by the accumulated value 85 obtained from the accumulator 63. The resultant value is transferred from the output port 87 to the multiplier 65. The multiplier 65 then fetches the counts held in all of the weight counters 44 to obtain the sum of the counts, and multiplies the sum by the result 87 from the division made by the divider 64 with the digits below the decimal point rounded off The reset value Wi thus obtained will then be transferred to one of the weight counters 47 which is associated with the service class i in question to be set therein as its appropriate reset value.

With the instant, alternative embodiment, the delay of cells is more appropriately controlled dependent upon the mode of traffic of cells than the embodiment shown and described with reference to FIG. 4, thus improving the possibiliby of ensuring the controlled delay in the respective service classes.

More specifically, where the traffic of cells 108 has a smaller dispersion, which means the traffic has a sharper average property, i.e. cells 108 arrive at intervals which are not distributed broadly, in a certain service class, a positive weight value may advantageously set in a weight counter 44 for that service class to reduce the delay with which the cells are transmitted because even when the queue in the service class includes no cell at a moment that queue is most likely to include a cell input with a higher probability. The alternative embodiment is more advantageously applicable to such a type of traffic.

Figure 6:
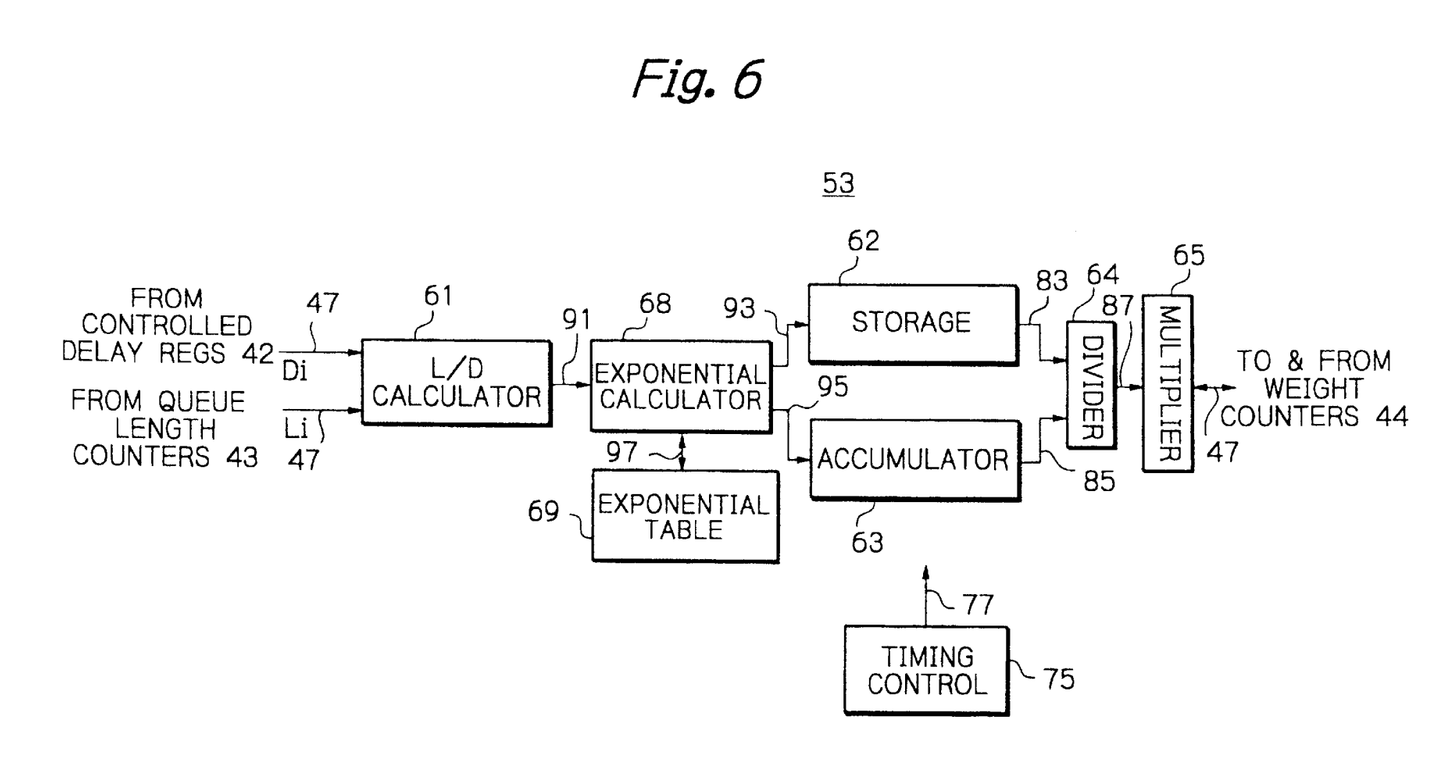

Referring now to FIG. 6, a further alternative embodiment of the weight calculator 53 is adapted to calculate a reset value Wi for the weight counter 44 of the service class i in accordance with the following expression (3).

$$Wi = Wt * \text{Exp}(Li/Di) \bigg/ \sum_{K=1}^{N} \text{Exp}(Lk/Dk), \quad (3)$$

where Exp(x) represents $e^x$.

In order to accomplish the expression (3), the embodiment of the weight calculator shown in FIG. 6 includes an exponential calculator 68 and an exponential table storage 69 in addition to the components shown and described with reference to FIG. 4. The exponential calculator 68 has its input port interconnected to the output 91 from the L/D calculator 16 and its input/output 97 interconnected to the exponential table storage 69, and has two outputs interconnected to the inputs 93 and 95 to the storage 62 and the accumulator 63, respectively. The exponential calculator 68 is adapted to receive the input data Li/Di from the L/D calculator 61, and consult with the exponential table storage 69 to obtain an exponential value corresponding to the input data Li/Di. The exponential table storage 69 is adapted to store the data of an exponential table, which defines the values of Exp(A) with respect to input values A supplied on the input/output connection 97. The table storage 69 serves to receive from the exponential calculator 68 the input value A corresponding to the input data Li/Di, and reference the resultant value Exp(A) corresponding to the input data A to produce it onto its input/output port 97. The exponential calculator 68 is responsive to the resultant value to provide the storage 62 and the accumulator 63 with the resultant value corresponding to Exp(Li/Di).

The timing control 75 is adapted to control the L/D calculator 61, exponential calculator 68, storage 62, accumulator 63, divider 64 and multiplier 65 so as to calculate the reset values W1–WN for all of the service classes 1–N according to the expression (3).

In operation, the L/D calculators 61 receives the values of the controlled delay Di and the queue length Li from the controlled delay register 42 and the queue length counter 43 associated with the service class i in question, respectively, to produce the resultant value Li/Di from its output 91 to the exponential calculator 68. The exponential calculator 68 consults with the exponential table stored in the storage 69, and obtains an exponential value corresponding to the input data Li/Di. In response, the exponential table storage 69 receives the input data Li/Di from the exponential calculator 68, and produces the resultant value Exp(Li/Di) corresponding thereto on its input/output port 97. The exponential calculator 68 in turn delivers the resultant value Exp(Li/Di) from its outputs 93 and 95 to the inputs of the storage 62 and the accumulator 63, resepectively.

The storage 62 temporarily stores the output data from the exponential calculator 68 to provide the one input 83 of divider 64 with the output data, while the accumulator 63 sums up the same output data from the exponential calculator 68 to produce the sum of the Li/Di with respect to all the service classes 1–N on its output 85 to the other input to the divider 64. The divider 64 in turn divides the Li/Di inputted from the storage 62 by the accumulated value 85 obtained from the accumulator 63. The same operations will then be performed on the divider 64 and the multiplier 65 as described on the alternative embodiment shown in FIG. 5. The reset value Wi thus obtained will then be transferred to one of the weight counters 47 associated with the service class i in question to be set therein as its appropriate reset value.

With the instant, further alternative embodiment, the delay of cells is more appropriately controlled dependent upon the amount of traffic and the controlled delay of cells. More specifically, in an application in which the traffic mode of cells 108 in a service class has the tendency of abruptly increasing the burst characteristics once it gets into the burst tendency, the exponential increase of the reset value Wi as defined by the expression (3) will cause more cells to be forwarded which increase exponentially, thus advantageously decreasing the delay of cells.

Otherwise, in another application in which the traffic mode of cells 108 in a service class has the tendency of abruptly decreasing the burst characteristics once it leaves the burst tendency, the exponential decrease of the reset value Wi as defined by the expression (3) will allow the rest from the decreased reset value Wi to be assigned to the remaining one or ones of the service classes, thus resulting in forwarding more cells in the other class or classes, thus advantageously decreasing the delay of cells.

Figure 7:
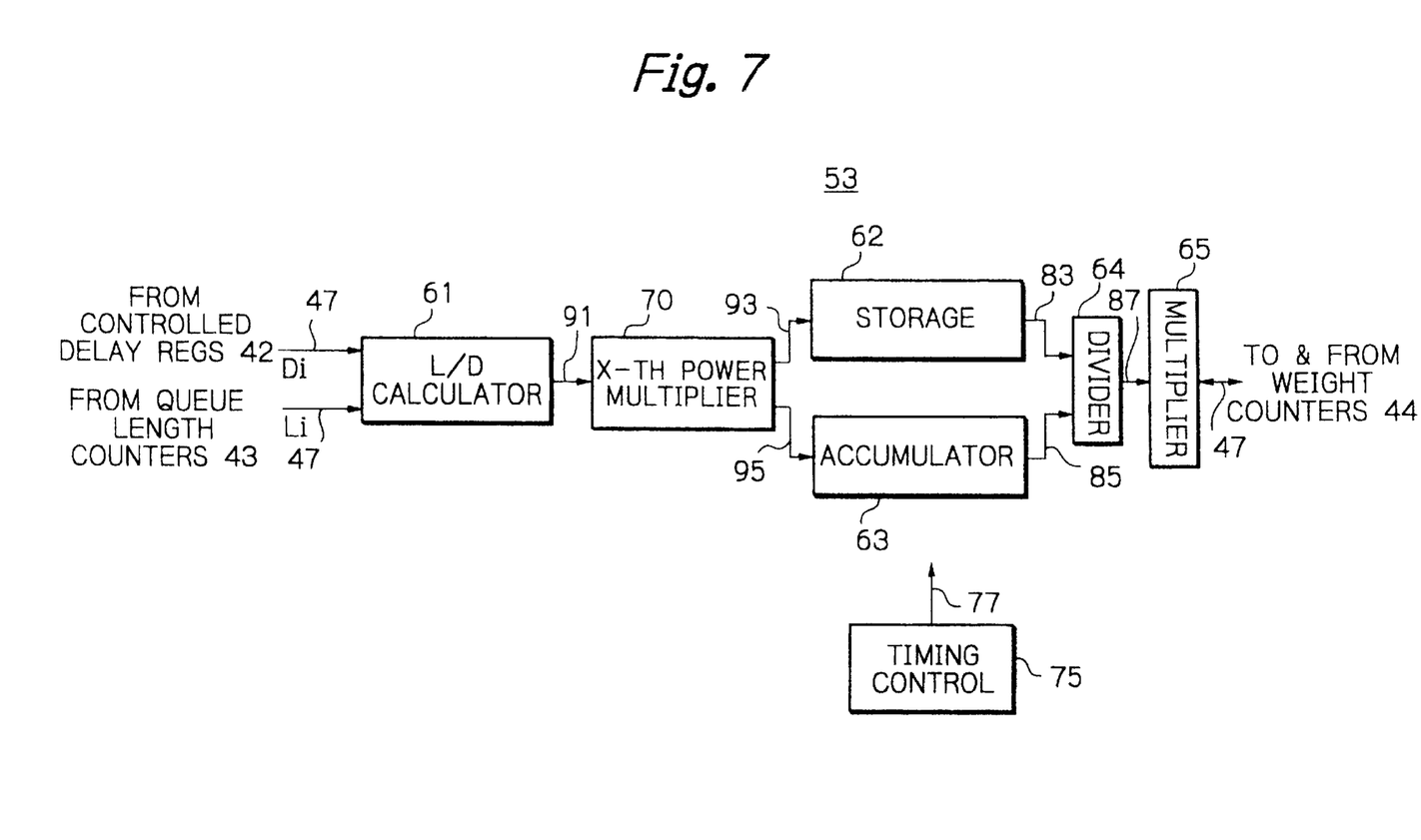

Referring now to FIG. 7, a still further alternative embodiment of the weight calculator 53 serves to calculate a reset value Wi for the weight counter 44 of the service class i in accordance with the following expression (4).

$$Wi = Wt * (Li/Di)^x \bigg/ \sum_{K=1}^{N} (Lk/Dk)^x, \quad (4)$$

where X represents a real number.

In order to execute the expression (4), the alternative embodiment of the weight calculator shown in FIG. 7 comprises an X-th power multiplier 70 in addition to the components shown and described with reference to FIG. 4. The X-th power multiplier 70 has its input port interconnected to the output 91 from the L/D calculator 61, and has two outputs interconnected to the inputs 93 and 95 to the storage 62 and the accumulator 63, respectively. The X-th power multiplier 70 is adapted to receive the input data Li/Di from the L/D calculator 61, and obtain the X-th power of the input data Li/Di. The power value X is preferably set in the multiplier 70 in advance or adaptively, taking account of the traffic characteristics of the cells 108 transferred in the ATM system 100. This will be described later in more detail. The multiplier 70 is adapted to produce the resultant value from the X-th power operation to the storage 62 and the accumulator 63.

The timing control 75 is adapted to control the L/D calculator 61, X-th power multiplier 70, storage 62, accumulator 63, divider 64 and multiplier 65 so as to calculate the reset values W1–WN for all of the service classes 1–N according to the expression (4).

In operation, the L/D calculator 61 receives the values of the controlled delay Di and the queue length Li from the controlled delay register 42 and the queue length counter 43 associated with the service class i in question, respectively, to produce the resultant value Li/Di from its output 91 to the X-th power multiplier 70. The multiplier 70 calculates the X-th power of the input data Li/Di to deliver the resultant value (Li/Di)X from its outputs 93 and 95 to the inputs of the storage 62 and the accumulator 63, respectively.

The storage 62 temporarily stores the output data from the multiplier 70 to provide the one input 83 of divider 64 with the output data, while the accumulator 63 sums up the same output data from the multiplier 70 to produce the sum of the Li/Di for all the service classes 1–N on its output 85 to the other input to the divider 64. The divider 64 in turn divides the Li/Di provided from the storage 62 by the accumulated value 85 obtained from the accumulator 63. The same operations will be executed on the divider 64 and the multiplier 65 as described on the alternative embodiment shown in FIG. 5. The reset value Wi thus obtained will then be transferred to one of the weight counters 47 which is associated with the service class i in question to be set therein as its appropriate reset value.

With the embodiment shown in FIG. 7, the value of power X may advantageously be set in the X-th power multiplier 70 such that it is set to a larger value if the mode of traffic of cells 108 in a service class has the tendency of abruptly increasing the burst characteristics once it gets into the burst tendency, or, the tendency of abruptly decreasing the burst characteristics once it leaves the burst tendency. That will allow more effective control of the delay of cells.

Figure 8:
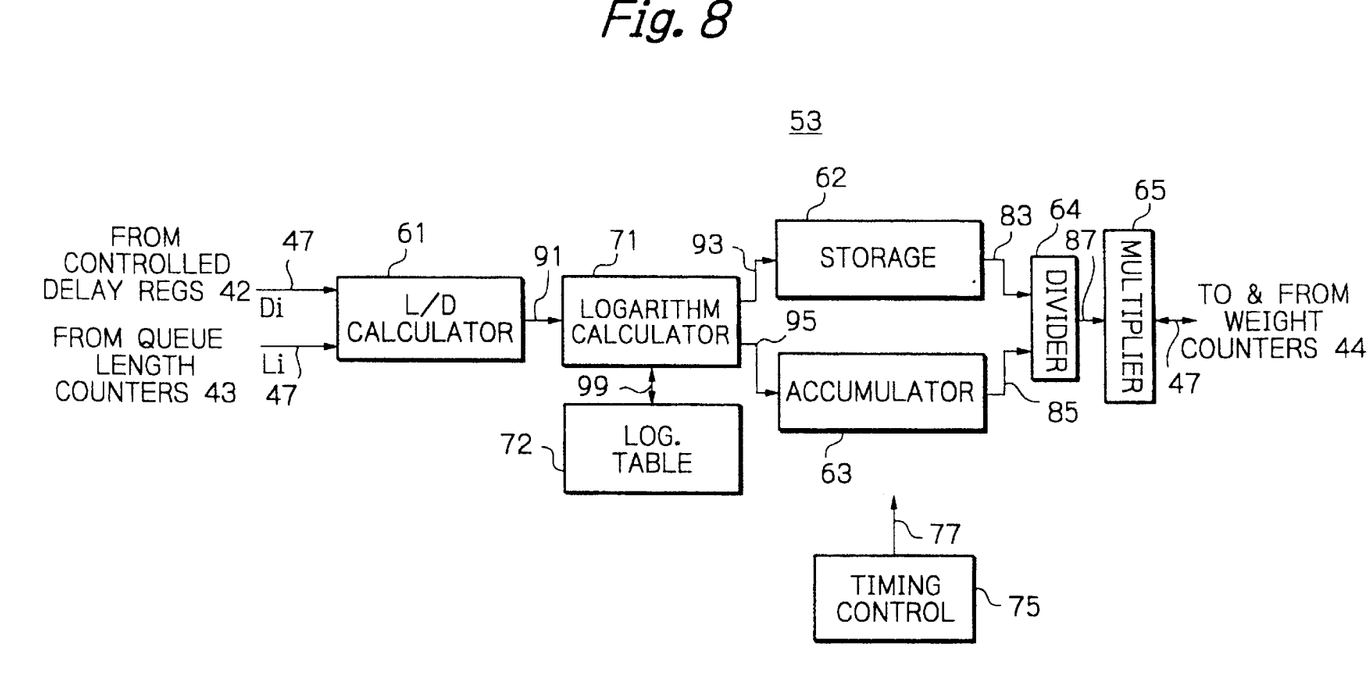

Well, referring now to FIG. 8, still another alternative embodiment of the weight calculator 53 functions to calculate a reset value Wi for the weight counter 44 of the service class i in accordance with the following expression (5).

$$Wi = Wt * \text{Log}(Li/Di) \bigg/ \sum_{K=1}^{N} \text{Log}(Lk/Dk), \quad (5)$$

where Log(X) represents a natural logarithm of X.

In order to accomplish the expression (5), the embodiment of the weight calculator shown in FIG. 8 includes a logarithm calculator 71 and a logarithm table storage 72 in addition to the components shown and described with reference to FIG. 4. The logarithm calculator 71 has its input port interconnected to the output 91 from the L/D calculator 16 and its input/output 99 interconnected to the logarithm table storage 72, and has two outputs interconnected to the inputs 93 and 95 to the storage 62 and the accumulator 63, respectively. The logarithm calculator 71 is adapted for receiving the input data Li/Di from the L/D calculator 61, and consulting with the logarithm table storage 72 to obtain a logarithm value corresponding to the input data Li/Di. The logarithm table storage 72 is adapted to store the data of a logarithm table, which defines the values of Log(A) with respect to input values A supplied on the input/output connection 99. The table storage 72 serves to receive from the logarithm calculator 71 the input value A corresponding to the input data Li/Di, and reference the resultant value Log(A) corresponding to the input data A to produce it onto its input/output port 99. The logarithm calculator 71 is operative in response to the resultant value to provide the storage 62 and the accumulator 63 with the resultant value corresponding to Log(Li/Di).

The timing control 75 is adapted to control the L/D calculator 61, logarithm calculator 68, storage 62, accumulator 63, divider 64 and multiplier 65 so as to calculate the reset values W1–WN for all of the service classes 1–N according to the expression (5).

In operation, the L/D calculator 61 receives the values of the controlled delay Di and the queue length Li from the controlled delay register 42 and the queue length counter 43 associated with the service class i in question, respectively, to produce the resultant value Li/Di from its output 91 to the logarithm calculator 71. The logarithm calculator 71 consults with the logarithm table stored in the storage 72, and obtains a logarithm of the input data Li/Di. In response, the logarithmic table storage 72 receives the input data Li/Di from the logarithm calculator 72, and produces the resultant value Log(Li/Di) on its input/output port 99. The logarithm calculator 71 in turn delivers the resultant value Log(Li/Di) from its outputs 93 and 95 to the inputs of the storage 62 and the accumulator 63, respectively.

The storage 62 temporarily stores the output data from the logarithm calculator 71 to provide the one input 83 of divider 64 with the output data, while the accumulator 63 sums up the same output data from the logarithmic calculator 71 to produce the sum of the Li/Di with respect to all the service classes 1–N on its output 85 to the other input to the divider 64. The divider 64 in turn divides the Li/Di delivered from the storage 62 by the accumulated value 85 obtained from the accumulator 63. The same operations will then be performed on the divider 64 and the multiplier 65 as described on the alternative embodiment shown in FIG. 5. The reset value Wi thus obtained will then be transferred to one of the weight counters 47 associated with the service class i in question to be set therein as its appropriate reset value.

With the instant, alternative embodiment, the delay of cells is more appropriately controlled dependent upon the amount of traffic and the controlled delay of cells. More specifically, in an application where the traffic mode of cells 108 in a service class has the tendency of gradually increasing the burst characteristics after it gets into the burst tendency, the logarithmic increase of the reset value Wi as defined by the expression (5) will allow the cells to be forwarded with the suppressed increase of the cells forwarded. That will permit the rest from the suppressively increased reset value Wi to be assigned to the remaining one or ones of the service classes, thus advantageously decreasing the delay of cells.

Otherwise, in another application in which the traffic mode of cells 108 in a service class has the tendency of gradually decreasing the burst characteristics after it leaves the burst tendency, the logarithmic decrease of the reset value Wi as defined by the expression (5) will allow more cells to be forwarded, thus advantageously decreasing the delay of cells.

Figure 10:
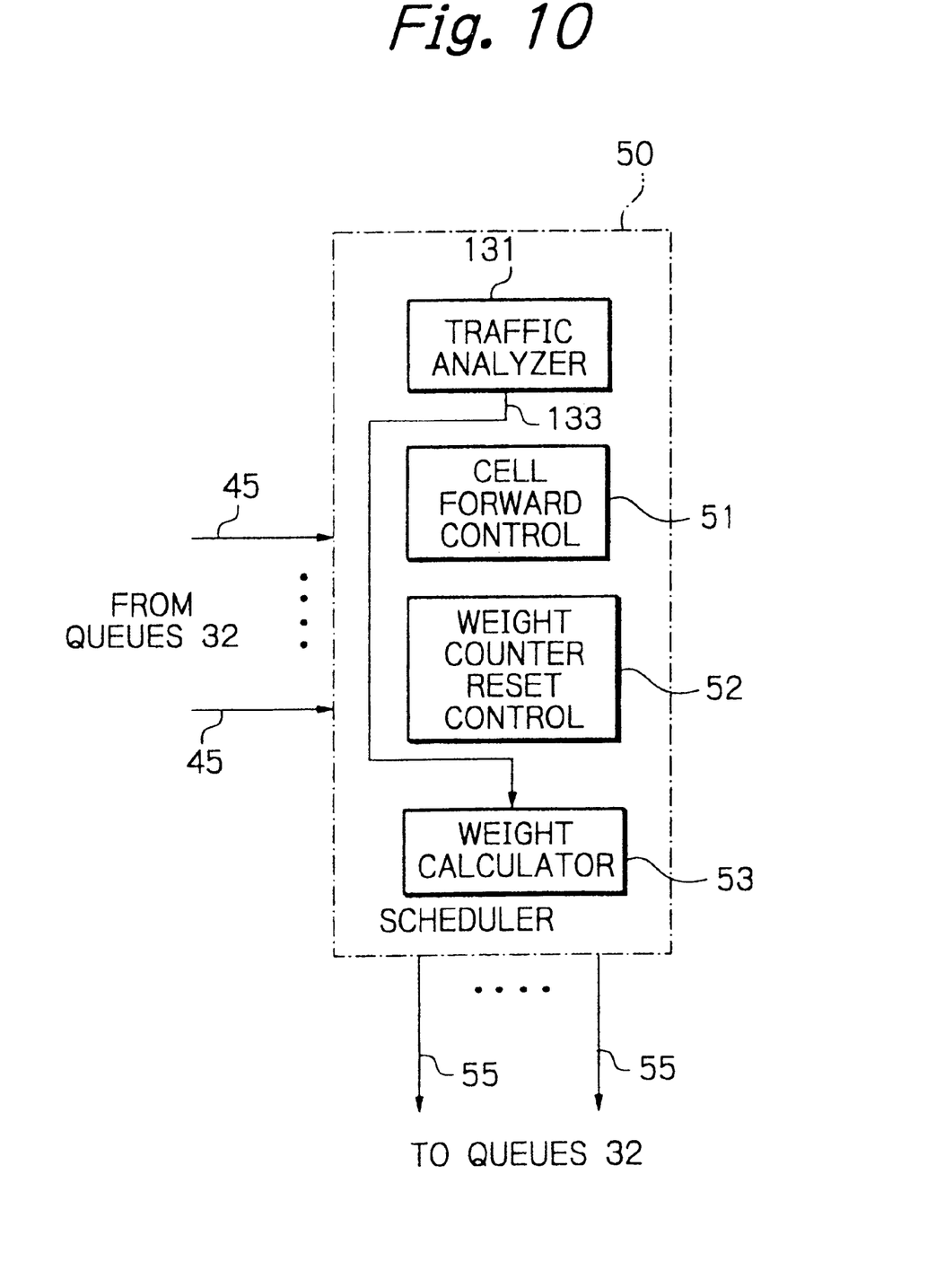
FIG. 10 shows an alternative embodiment of the scheduler of the embodiment shown in FIG. 1.
Figure 11:
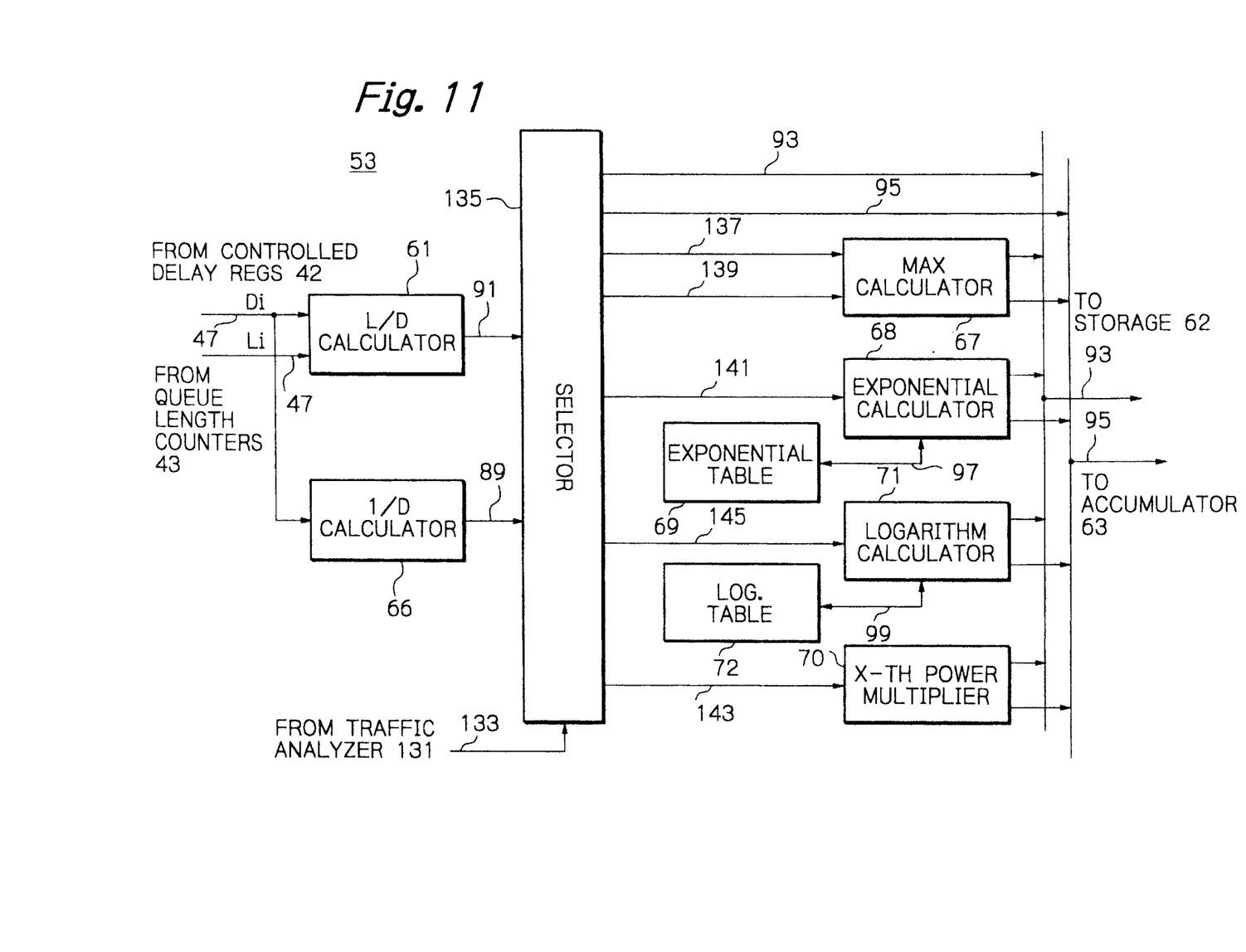
FIG. 11 shows in a schematic block diagram part of the weight calculator included in the alternative embodiment shown in FIG. 10.

The ways of calculating a reset value for the weight counters 44 described above are specific examples implementing the present invention, and should not be understood as restricting the scope of the invention. For example, any combination of those ways of calculating a reset value described above may be applicable. With reference to FIGS. 10 and 11, a further alternative embodiment of the invention will be described which is adapted to adaptively select an appropriate way of reset value calculation in response to the characteristics of the ATM cell traffic conveyed by the ATM switching system 100.

As shown in FIG. 10, the scheduler 50 includes a traffic analyzer 131 which functions as analyzing the ATM cell traffic conveyed by the ATM switch 102 and determining which of the ways of calculating a reset value for the weight counters 44 is selected appropriately for the traffic. More specifically, the traffic analyzer 131 is adapted to monitor the queues 32 at the intervals of resetting the weight counters 44 for the service classes so as to obtain the statistics for the respective service classes on the time intervals at which ATM cells 108 arrive to determine the burst tendency of the ATM cell arrival. The traffic analyzer 131 notifies the weight calculator 53 via a connection 133 of one of the reset value calculating ways which is determined the most appropriate for the traffic characteristics thus analyzed.

With reference to FIG. 11, a specific structure of the weight calculator 53 applicable to the embodiment of the scheduler 50 shown in FIG. 10 includes a selector 135 which is adapted to be responsive to the signal provided from the traffic analyzer 131 over the connection 133 to selectively connect the L/D calculator 61 and the 1/D calculator 66, if appropriate, directly to the connections 93 and 95, or either one of the maximum calculator 67, the exponential calculator 68, the X-th power multiplier 70 and the logarithm calculator 71.

More specifically, when the traffic analyzer 131 transfers on the connection 133 the signal which does not specify the characteristics of the cell traffic passing the ATM switch 102 for a service class in question, the selector 135 in turn connects the output 91 from the L/D calculator 61 to both of the output ports 93 and 95 to the storage 62 and accumulator 63, respectively, so as to cause a reset value for the weight counters 44 to be calculated in accordance with the expression (1) described above with reference to FIG. 4.

If the traffic analyzer 131 determines the traffic of cells 108 passing the ATM switch 102 has a smaller dispersion, in other words, a sharper average property, in a certain service class, to send the appropriate signal on the connection 133 to the selector 135, the selector 135 in turn connects the outputs 91 and 89 from the L/D calculator 61 and 1/D calculator 66 to the input ports 137 and 139 to the maximum calculator 67, respectively, so as to cause the maximum calculator 67 to calculate a reset value for the weight counters 44 pursuant to the expression (2) described above with reference to FIG. 5.

If the traffic analyzer 131 determines that the traffic of cells 108 in a service class has the tendency of abruptly increasing the burst characteristics once it gets into the burst tendency, then the analyzer 131 notifies the selector 135 accordingly over the connection 133. The selector 135 in turn connects the output 91 from the L/D calculator 61 to the input port 141 of the exponential calculator 68, so as to cause the exponential calculator 68 to calculate a reset value for the weight counters 44 pursuant to the expression (3) described above with reference to FIG. 6.

If the traffic analyzer 131 determines that the traffic of cells 108 in a service class has the tendency of abruptly increasing the burst characteristics once it gets into the burst tendency, or, the tendency of abruptly decreasing the burst characteristics once it leaves the burst tendency, then the analyzer 131 notifies the selector 135 accordingly through the connection 133. The selector 135 in turn connects the output 91 from the L/D calculator 61 to the input port 143 of the X-th power calculator 70, so as to cause the X-th power calculator 70 to calculate a reset value for the weight counters 44 pursuant to the expression (4) described above with reference to FIG. 7.

Finally when the traffic analyzer 131 determines that the traffic of cells 108 in a service class has the tendency of gradually increasing the burst characteristics after it gets into the burst tendency, the analyzer 131 in turn notifies the selector 135 accordingly via the connection 133. The selector 135 in turn connects the output 91 from the L/D calculator 61 to the input port 145 of the logarithmic calculator 71, so as to cause the logarithmic calculator 71 to calculate a reset value for the weight counters 44 on the basis of the expression (5) described above with reference to FIG. 8.

The above description is made on the preferred embodiments formed by the functional blocks and the lines interconnecting those blocks, the functional blocks representing the functions understandable for the purpose of simplicity. In practice, a variety of embodiments are not restricted by those embodiments formed by the specific functional blocks. In an alternative embodiment, each of the status registers 41 for the respective service classes may, for example, be adapted to have the status variables, such as a controlled delay register, a queue length counter and a weight counter, adapted to increment and decrement, and receive a notification of incoming and outgoing ATM cells 108 from associated one of the queues 32 for a service class and instructions of increment and decrement from the scheduler 50.

Alternatively, each of the status registers 41 for the respective service classes per se may be adapted to monitor an associated one of the queues 32 to increment and decrement an associated one of the queue length counters 43 in response to incoming and outgoing ATM cells 108. The controlled delay registers 42 may not be included in the status register 41 but the scheduler 50.

In addition, each of the status registers 41 may be adapted to set a reset value Wi to the weight counter 44, when reset, by the weight calculator 53, or alternatively by the status register 41 per se responding to a notification from the weight calculator 53.

The illustrative embodiments shown and described above are implemented as including hardware, such as registers and counters. That hardware may of course be implemented partially or entirely by software, or program sequences. The controlled delay registers 42, the queue length counters 43 and weight counters 44, for example, may be implemented on a memory area in a processor system executing the program sequences. In that case, a notification from the queues 32 of incoming and outgoing ATM cells may be in the form of interruptions to the program sequences.

The entire disclosure of Japanese patent application No. 79260/1998 filed on Mar. 26, 1998, including the specification, claims, accompanying drawings and abstract of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What I claim is:

1. An apparatus for scheduling cell forwarding for use in an asynchronous transfer mode (ATM) network for switching ATM cells, comprising:

a plurality of queues each provided for one of a plurality of classes of transmission quality for queuing up an ATM cell in a corresponding one of the classes which is required by the ATM cell;

a cell classifying circuit for receiving an ATM cell and classifying the ATM cell received to one of said plurality of queues in accordance with the class required by the ATM cell;

a status circuit for detecting a status of said plurality of queues and storing status data representative of the status detected;

a scheduling circuit operative in response to said status circuit for determining when the ATM cell queuing up in said plurality of queues is to be forwarded, wherein said scheduling circuit determines for each of the classes a weight on the basis of which the ATM cell queuing up in a corresponding one of said queues is to be forwarded, and causes said plurality of queues to forward the ATM cell in accordance with the weight determined, wherein said scheduling circuit resets the weight for each of said plurality of queues to a reset value when the status data represents a predetermined condition, wherein said scheduling circuit calculates the reset value for each of the classes, and wherein said scheduling circuit calculates the reset value on the basis of a ratio of a queue length of the ATM cells which queue up in each of said queues to an allowable delay of the ATM cells which queue up in corresponding one of said queues.

2. The apparatus in accordance with claim 1, wherein the predetermined condition is when the queue lengths of the ATM cells queuing up in said plurality of queues are zero.

3. The apparatus in accordance with claim 1, wherein the predetermined condition is when the weights for said plurality of queues are zero.

4. An apparatus for scheduling cell forwarding for use in an asynchronous transfer mode (ATM) network for switching ATM cells, comprising:

a plurality of queues each provided for one of a plurality of classes of transmission quality for queuing up an ATM cell in a corresponding one of the classes which is required by the ATM cell;

a cell classifying circuit for receiving an ATM cell and classifying the ATM cell received to one of said plurality of queues in accordance with the class required by the ATM cell;

a status circuit for detecting a status of said plurality of queues and storing status data representative of the status detected, wherein said status:circuit comprises:

a plurality of weight counters each provided for one of said plurality of queues for storing the weight and incrementing or decrementing the weight in response to said one queue receiving or forwarding the ATM cell, respectively; and a plurality of delay registers each provided for one of said plurality of queues for storing the allowable delay of the ATM cell for the class associated with said one queue; and a scheduling circuit operative in response to said status circuit for determining when the ATM cell queuing up in said plurality of queues is to be forwarded, wherein said scheduling circuit determines for each of the classes a weight on the basis of which the ATM cell queuing up in a corresponding one of said queues is to be forwarded, and causes said plurality of queues to forward the ATM cell in accordance with the weight determined; said scheduling circuit comprising:

a weight calculating circuit for determining a reset value for each of said plurality of weight counters on the basis of a ratio of a queue length of the ATM cells which queue up in corresponding one of said plurality of queues to an allowable delay of the ATM cell queuing up in said one queue; and a reset control circuit for resetting said plurality of weight counters to the reset value under a predetermined condition.

5. The apparatus in accordance with claim 4, wherein said reset control circuit resets said plurality of weight counters when the queue lengths of the ATM cells queuing up in said plurality of queues are zero.

6. The apparatus in accordance with claim 4, wherein said reset control circuit resets said plurality of weight counters when said plurality of weight counters store zero as the weight.

7. The apparatus in accordance with claim 4, wherein said scheduling circuit further comprises a cell forward control circuit for causing said plurality of queues to forward the ATM cell in accordance with the weight stored in said plurality of weight counters.

8. A method of scheduling cell forwarding for use in an asynchronous transfer mode (ATM) network for switching an ATM cell, comprising the steps of:

preparing a plurality of queues each for one of a plurality of classes of transmission quality for queuing up an ATM cell in a corresponding one of the classes which is required by the ATM cell;

receiving an ATM cell;

classifying the ATM cell received to one of the plurality of queues in accordance with the class required by the ATM cell;

detecting a status of the plurality of queues and storing status data representative of the status detected;

determining, in response to the status data, when the ATM cell queuing up in the plurality of queues is to be forwarded;

determining for each of the classes a weight on the basis of which the ATM cell queuing up in a corresponding one of the queues is to be forwarded;

controlling the plurality of queues to forward the ATM cell in accordance with the weight determined;

resetting the weight for each of the plurality of queues to a reset value when the status data represents a predetermined condition; and calculating the reset value for each of the classes on the basis of a ratio of a queue length of the ATM cells which queue up in each of the queues to an allowable delay of the ATM cells which queue up in corresponding one of the queues.

9. The method in accordance with claim 8, wherein the predetermined condition is when the queue lengths of the ATM cells queuing up in the plurality of queues are zero.

10. The method in accordance with claim 8, wherein the predetermined condition is when the weights for the plurality of queues are zero.

11. An asynchronous transfer mode (ATM) switching system for use in an ATM network for switching ATM cells, comprising:

an ATM switch having an incoming port and an outgoing port for switching the ATM cells received on the incoming port to the outgoing port;

a plurality of queues each provided for one of a plurality of classes of transmission quality for queuing up an ATM cell in a corresponding one of the classes which is required by the ATM cell;

a cell classifying circuit for receiving an ATM cell from said outgoing port and classifying the ATM cell received to one of said plurality of queues in accordance with the class required by the ATM cell;

a status circuit for detecting a status of said plurality of queues and storing status data representative of the status detected; and a scheduling circuit operative in response to said status circuit for determining when the ATM cell queuing up in said plurality of queues is to be forwarded, wherein said scheduling circuit determines for each of the classes a weight on the basis of which the ATM cell queuing up in a corresponding one of said queues is to be forwarded, and causes said plurality of queues to forward the ATM cell in accordance with the weight determined, wherein said scheduling circuit resets the weight for each of said plurality of queues to a reset value when the status data represents a predetermined condition, wherein said scheduling circuit calculates the reset value for each of the classes, and wherein said scheduling circuit calculates the reset value on the basis of a ratio of a queue length of the ATM cells which queue up in each of said queues to an allowable delay of the ATM cells which queue up in corresponding one of said queues.

* * * * *